INVENTOR.
JOHANN F. HELLENKAMP
BY
ATTORNEY.

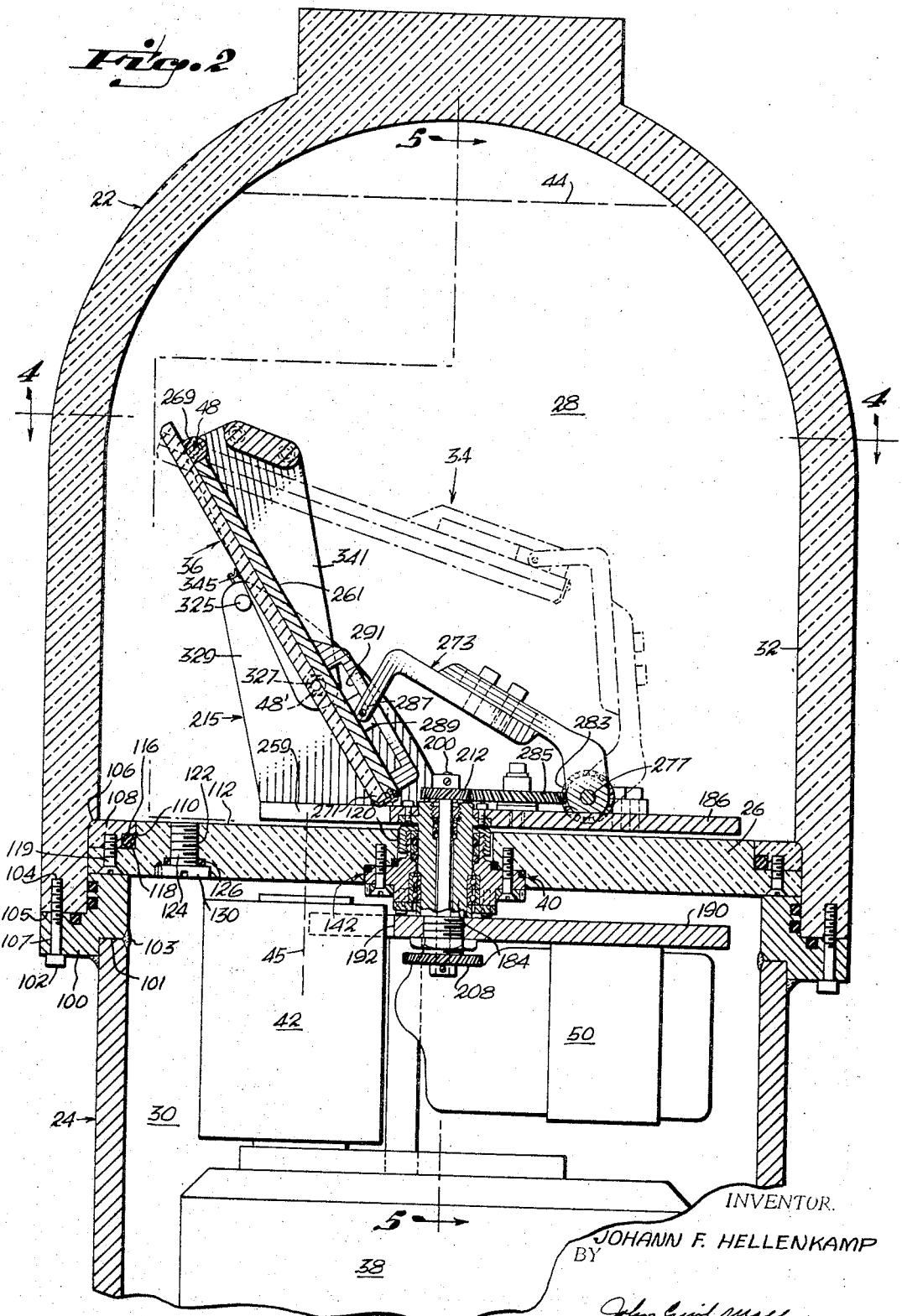

Oct. 31, 1967   J. F. HELLENKAMP   3,349,680
UNDERWATER SCANNING DEVICE
Filed June 28, 1966
6 Sheets-Sheet 3
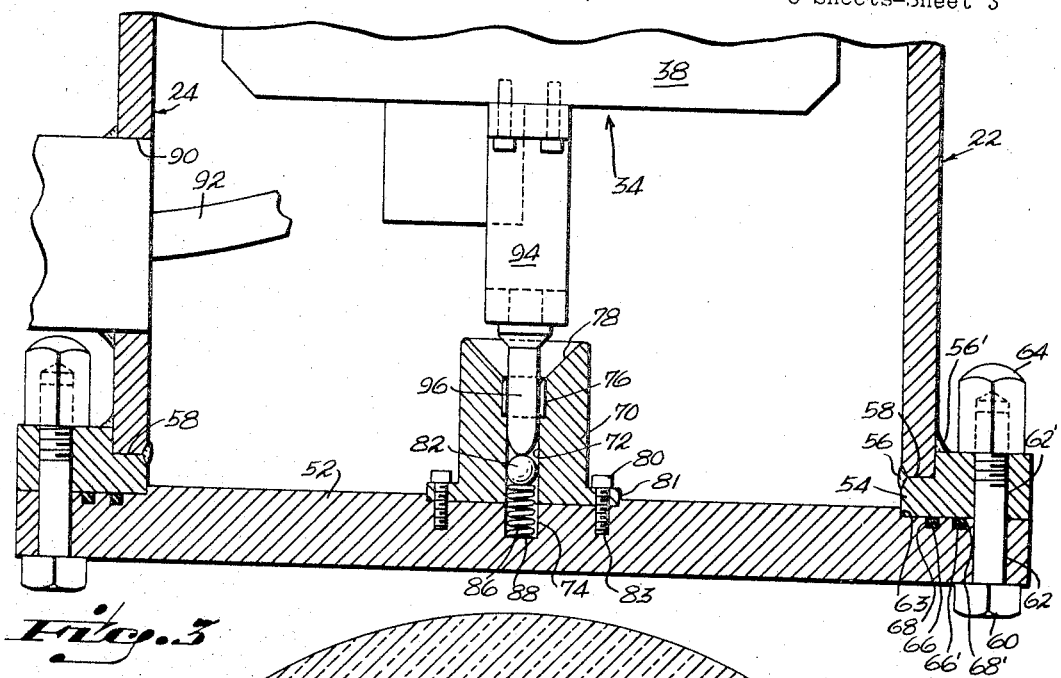
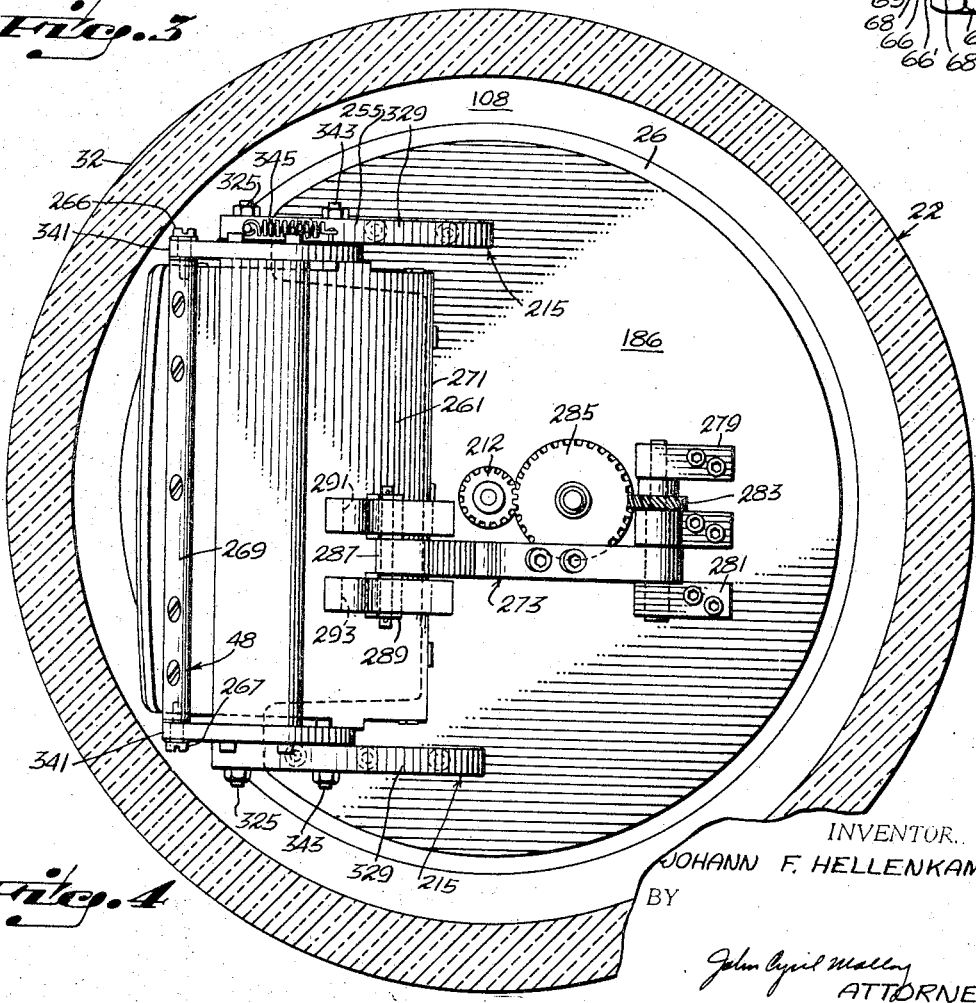
INVENTOR.
JOHANN F. HELLENKAMP
BY
John Cyril Malloy
ATTORNEY.

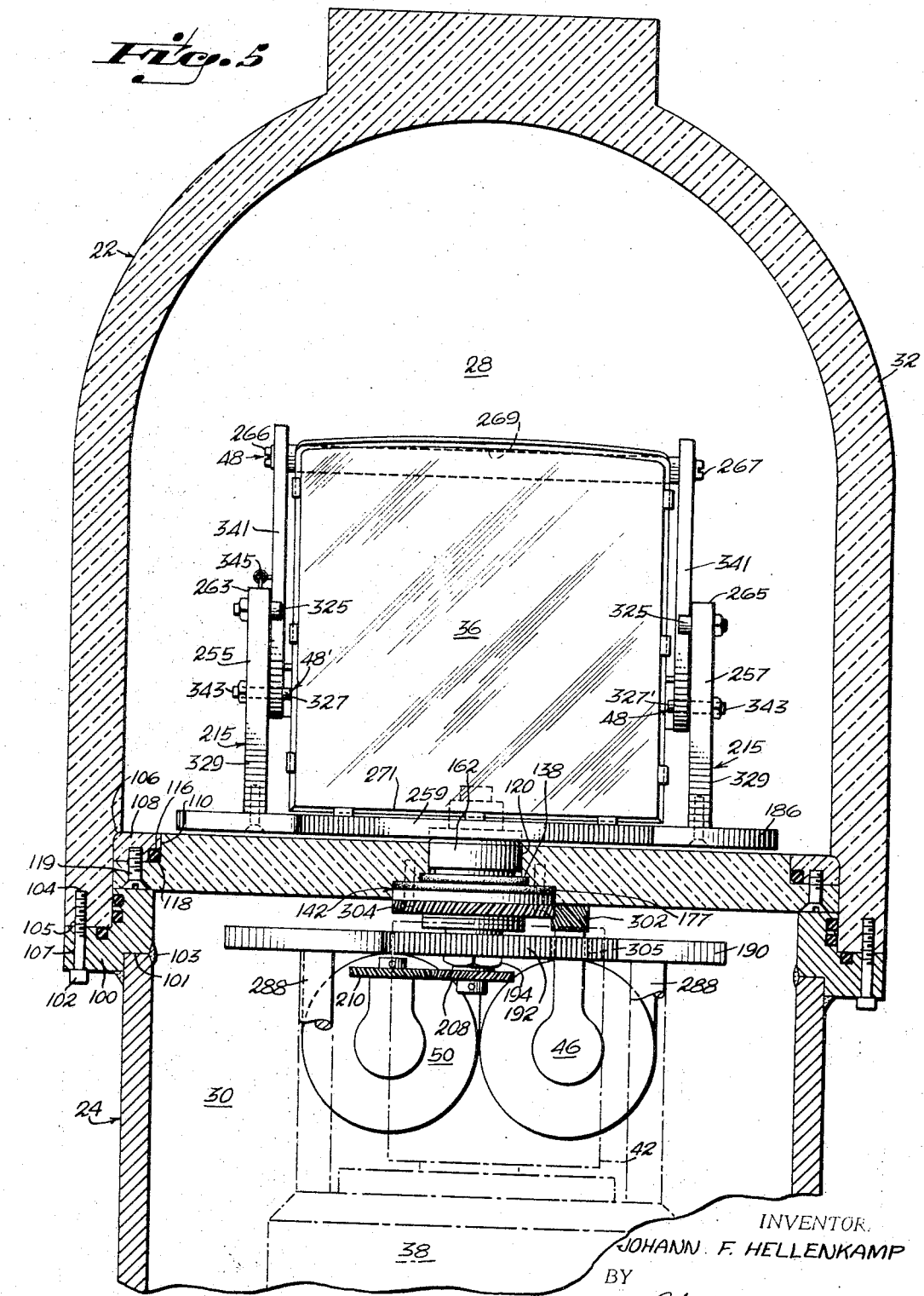

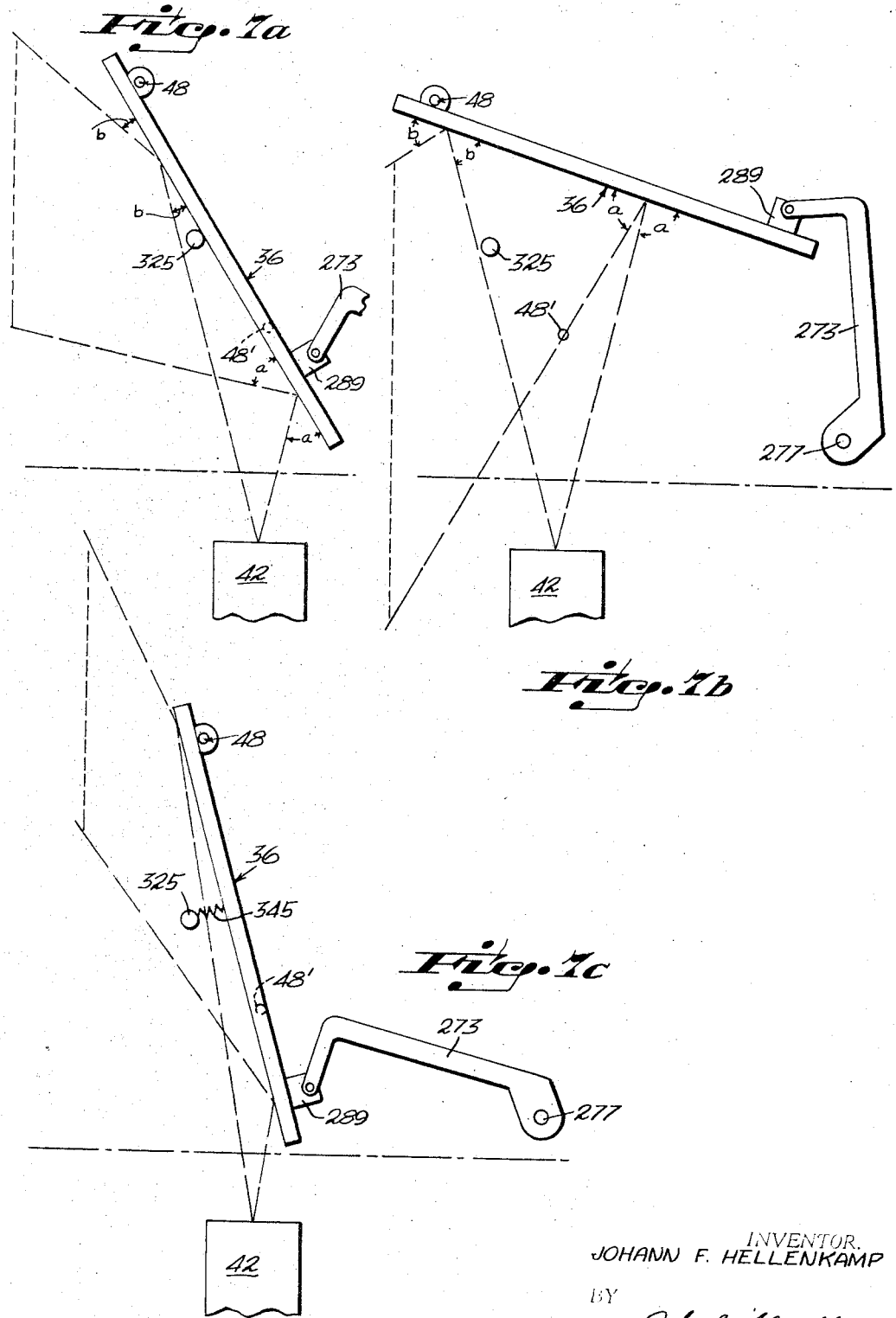

United States Patent Office 3,349,680
Patented Oct. 31, 1967

3,349,680
UNDERWATER SCANNING DEVICE
Johann F. Hellenkamp, 7401 SW. 57th Terrace,
Miami, Fla. 33143
Filed June 28, 1966, Ser. No. 561,164
10 Claims. (Cl. 95—11)

The instant invention is of a scanning device adapted for use when submerged in a liquid.

The instant invention includes means to house a camera to scan under water, which camera is preferably of the television type operatively connected to show a picture at a remote point on a screen, such as on board ship or on shore.

Current interest in underwater activity, either natural or man made, had led to the need for an underwater scanning device. For instance, it is often desired to study the breeding habits of schools of fish for improving of breeding techniques; also, an attempt is being made to investigate farming possibilities in underwater or submerged fields. Further, numerous military defense mechanisms are disposed under the water and these require inspection from time to time. The instant device is for underwater scanning purposes and is adapted to either be positioned in a predetermined submerged location or adjustably moved through the water with the device being composed of structure and mechanisms such that distortion caused by light refraction is minimized and a scanning range of movement is maximized.

It is, accordingly, an object of this invention to provide an underwater scanning device which includes a housing for a camera arranged to view a mirror, with the camera and the mirror being in separate chambers and the mirror chamber being water tight and adapted to be filled with a liquid so that the image as seen by the mirror through transparent mirror chamber walls is not appreciably distorted by light refraction phenomena which takes place on the passage of light rays between mediums of substantially varying densities and the relatively undistorted image may be recorded by the camera.

It is another object of the instant invention to provide an underwater scanning device as described in the preceding paragraph wherein the mirror and the camera are arranged as elements of a rotatable system to carry the lens of the camera and the mirror such that the two rotate as a unit through a first order of movement of scanning.

It is another object of the instant invention to provide a device as described in the preceding paragraph wherein the mirror is arranged in the mirror chamber and adapted to be tilted to provide for tilting of the mirror to scan or face in a second order of scanning.

It is another and general object of the instant invention to provide an underwater scanning device of the type described more fully hereinafter which is arranged, constructed and adapted to provide for a maximum range of underwater scanning through remote means to vary the picture seen by the scanning means.

It is also an object of this invention to provide a housing having a transparent closed portion with a transparent septum to separate the housing into a mirror chamber and a camera chamber and with the mirror arranged to see through the transparent walls of the housing and to be aligned with the lens of the camera in the camera chamber so that the image as seen by the mirror may be recorded by the camera and the mirror chamber is watertight to immerse the mirror in liquid.

In accordance with these and other objects which will become apparent hereinafter, the instant invention will now be described with reference to the accompanying drawings illustrating a preferred embodiment thereof.

In the drawings:

FIG. 2 is a partial view which is in cross section and illustrates the construction of the invention shown in FIG. 1;

FIG. 3 is a view in cross section of the other end of the scanning device which is partially illustrated in FIG. 2;

FIG. 4 is a view in cross section taken along the plane indicated by the arrowed line 4—4 of FIG. 2 and looking in the direction of the arrows;

FIG. 5 is a view in cross section which is similar to that shown in FIG. 2 and being taken along the planes indicated by the arrowed line 5—5 of FIG. 2 and looking in the direction of the arrows;

FIGS. 7a, 7b and 7c illustrate the angular range of tilt adjustment to vary the segment of the panoramic view seen by the reflector means between an angle of incidence approaching zero toward the zenith and an angle such that a segment of a panoramic view may be selected below the horizon plane.

Figure 1:
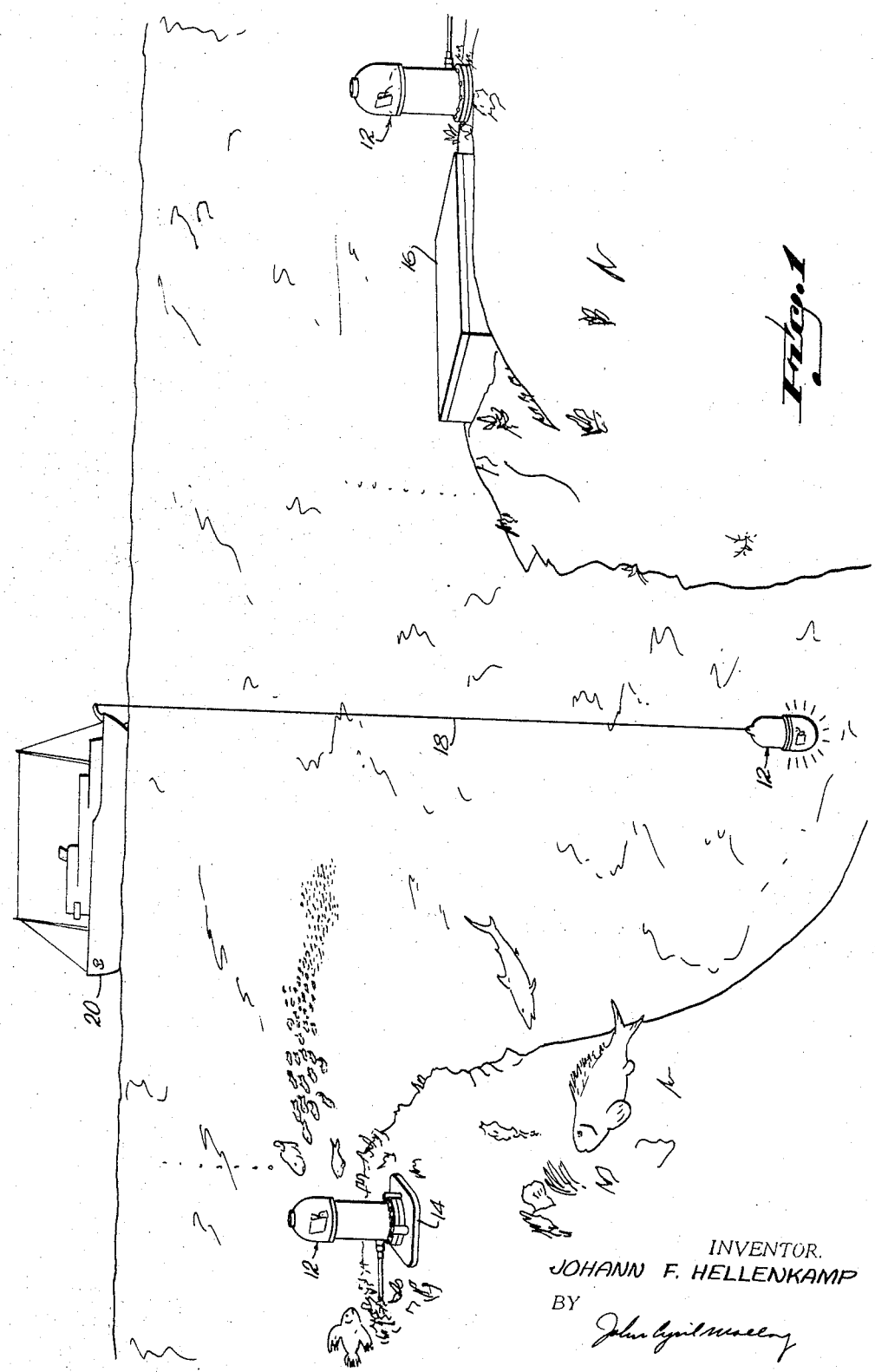
FIG. 1 is a perspective view illustrating various utilizations of the instant invention.

Referring to the drawings wherein like reference characters designate like or corresponding parts throughout the different views, and referring particularly to FIG. 1, the numeral 12 generally designates the underwater scanning device in several possible attitudes and positions for use: To the left-hand side of FIG. 1 the device is shown secured to a base 14 and adapted for use in observing underwater marine life and activity; to the right-hand side of FIG. 1 the device is shown secured adjacent an armed military device designated by the numeral 16 which is of the type required to be inspected visually from time to time; and in the center the device is shown in an inverted attitude with respect to the two previously identified positions and suspended on a cable 18 from a ship 20 whereby it is adapted to scan at an adjustable depth.

Before describing in detail the preferred embodiment of the device shown in the drawings, it will be helpful to a general understanding of the invention to refer to FIG. 2. Initially, it will be seen that the device includes a housing 22 preferably defined by a main housing wall 24 which is bridged intermediate its height by a transparent septum 26 to separate the housing into a mirror chamber 28 and a camera chamber 30. As shown, the upper or mirror chamber portion 32 of the main housing walls 24 are transparent and together with the septum 26 co-operate to close the mirror chamber 28 so that it is a fluid-tight capsule or chamber. Within each chamber, the mirror chamber and the camera chamber, assemblies to be described in detail hereinafter are located, the said assemblies being part of a rotatable system. The rotatable system is designated generally by the numeral 34; the system includes, generally, a mirror assembly 36 in the mirror chamber and a camera means 38 in the camera chamber and, also, includes connector means 40 to connect the mirror assembly and the camera means for rotation as a unit about an axis extending through the septum and into each chamber with the lens system of the camera and the mirror being of common eccentricity with respect to the axis. That is, the lens system 42 of the camera is arranged to view the reflective portion of the mirror assembly at all times along a line, the lens view line 45, which is parallel to the aforesaid axis and is spaced therefrom. The projection of the mirror means, and more specifically the projection of the reflector portion thereof 36, which faces in a direction toward the lens system 42 and parallel to the aforesaid axis and lens view line 45 is at all times eccentric to the axis of rotation, and the lens system 42 of the camera means at all times looks or views the projection or image on the reflector means 36. Drive means 46, see FIG. 5, are arranged in the device to rotate the entire system 34 as a unit about the axis through the septum and, thereby, to vary the direction or segment which the mirror faces, and, consequently, the camera view. Also, a tilt mechanism may be included in the system to rotate the mirror assembly about a main lateral axis 48 in the capsule 28 to tilt the mirror surface with respect to the aforesaid lens viewing axis; the tilt mechanism may include drive means 50 operatively connected to the reflector means 36 of the mirror assembly to tilt it with respect to the axis 48. The chamber 28 is adapted to be filled with a liquid to the indicated liquid level line 44. The liquid is preferably a clear, transparent liquid of substantially similar density to that of sea water or fresh water, depending upon the liquid into which the device is to be immersed in use.

It is thus seen that in operation the camera means and mirror assembly may be caused to rotate as a unit about the axis of the connector means 40 which extends through the spetum and in the preferred embodiment is coincident with the vertical center line of the device. As the system including the mirror assembly and the camera means are rotated through the range of movement indicated in FIG. 4, which is 360 degrees, a first order of scanning is achieved to scan all around the device. Also, the direction in which the mirror means or reflector means faces may be altered in a second order of scanning to look up or down with respect to the septum by tilting the mirror about the lateral axis 48 of the mirror assembly through a first stage of tilt and, as will be described hereinafter, if desired, through a second stage of tilt about a secondary lateral axis 48' of the mirror assembly.

In the following paragraphs the structure for carrying out the aforesaid operation will be described in more detail.

The construction of the lower portion of the housing 22, which is best seen in FIG. 3, will now be described. The preferred construction is characterized by a lower or main cylindrical wall portion 24 which is closed at the lower end 58 thereof by a disk-shaped member 52. to achieve this, a flanged ring 54 is secured as at 56 and 56' to the lower end 58 of the housing and headed screws 60 are passed through registering bores 62 and 62' of the disk-shaped member 52 and ring 54. The screws are held by the nuts 64 and preferably the marginal edge 63 of the disk-shaped member 52 is stepped to seat the confronting face of the flanged ring 54 and includes annular grooves 68 and 68' to nestle a pair of O-rings 66 and 66', an inner and an outer ring, and captivate the said rings between the confronting faces of the ring 54 and member 52. Interiorly of the housing there is carried on the disk-shaped member 52 a main vertical upstanding bearing block 70 to act as a standard and journal for rotation of the main system 34. In the embodiment shown, the bearing block 70 is provided with an axial bore 72 therethrough which in assembly is in alignment with and co-cylindrical with a recess 74 in the face of the member 52. The bore 72 is counterbored and countersunk as at 76 and 78. Also, suitable fastening means such as the threaded headed screws 80, receivable in the flanged foot 81 of the bearing block 70, are adapted to hold the bearing block in the position shown in FIG. 3 on tightening of the screws into the recesses 83. Within the main bore 72 of the main bearing block 70 a ball 82 may be housed, which is of a diameter slightly less than that of the bore 72 to permit of resilient axial cushioning movement within the bore as energy is stored or released in a spring 86 which is captivated between the floor 88 of the recess 74 and the wall. The camera 38 is rotatably supported on the bearing block by means of a depending bracket member 94 which carries an extending bullet-shaped pin 96, the nose of which in assembly is on the aforesaid ball 82 to resiliently cushion the camera means within the camera chamber on a relatively small zone of contact between the pin nose and the ball.

Referring to the left-hand side of FIG. 3, it will be seen that an opening 90 may be provided in the side wall 24 to accommodate passage of an electrical energy conductor 92 into the housing. The camera chamber is preferably fluid tight and, therefore, suitable means are provided to hold the conductor 92 in the opening 90 to maintain the fluid tightness of the camera chamber. The electrical energy from a remote source is for the purpose of energizing drive means which were referred to in the previous paragraphs.

With reference to FIG. 2, it has been pointed out that the upper end of the cylindrical wall 24 at the upper end of the camera chamber is bridged by the septum 26 which is clamped between the hooded transparent upper portion walls 32 and an annular flange member 100 secured to the end 101 of the wall 24 by suitable means such as that indicated by the numeral 103. The flange member 100 is in turn secured to the mirror chamber side face 105 of the hood 32 by the screws such as 102 receivable in threaded recesses 104 of the hood which co-operate with the bores 107 of the flange member 100. Preferably the hood is provided with a shoulder 106 in the interior wall to nestle against an annular transparent ring 108 glued in the shoulder and in assembly seated in an annular groove 110 in the mirror side face 112 of the septum. The ring may be provided with a notch 116 in the inside corner thereof to captivate an O-ring 118 all for the purpose of maintaining the mirror chamber and the camera chamber in fluid-tight relation when the screws 119 are used to connect the septum 26 to the hood.

It will be seen that the septum 26 includes an eccentric passageway 122 which is normally closed by a threaded plug 124 which carries an O-ring 126 captivated on the stem immediately adjacent the head 130, which passageway is for charging liquid to be encapsulated in the mirror chamber 28.

Figure 6:
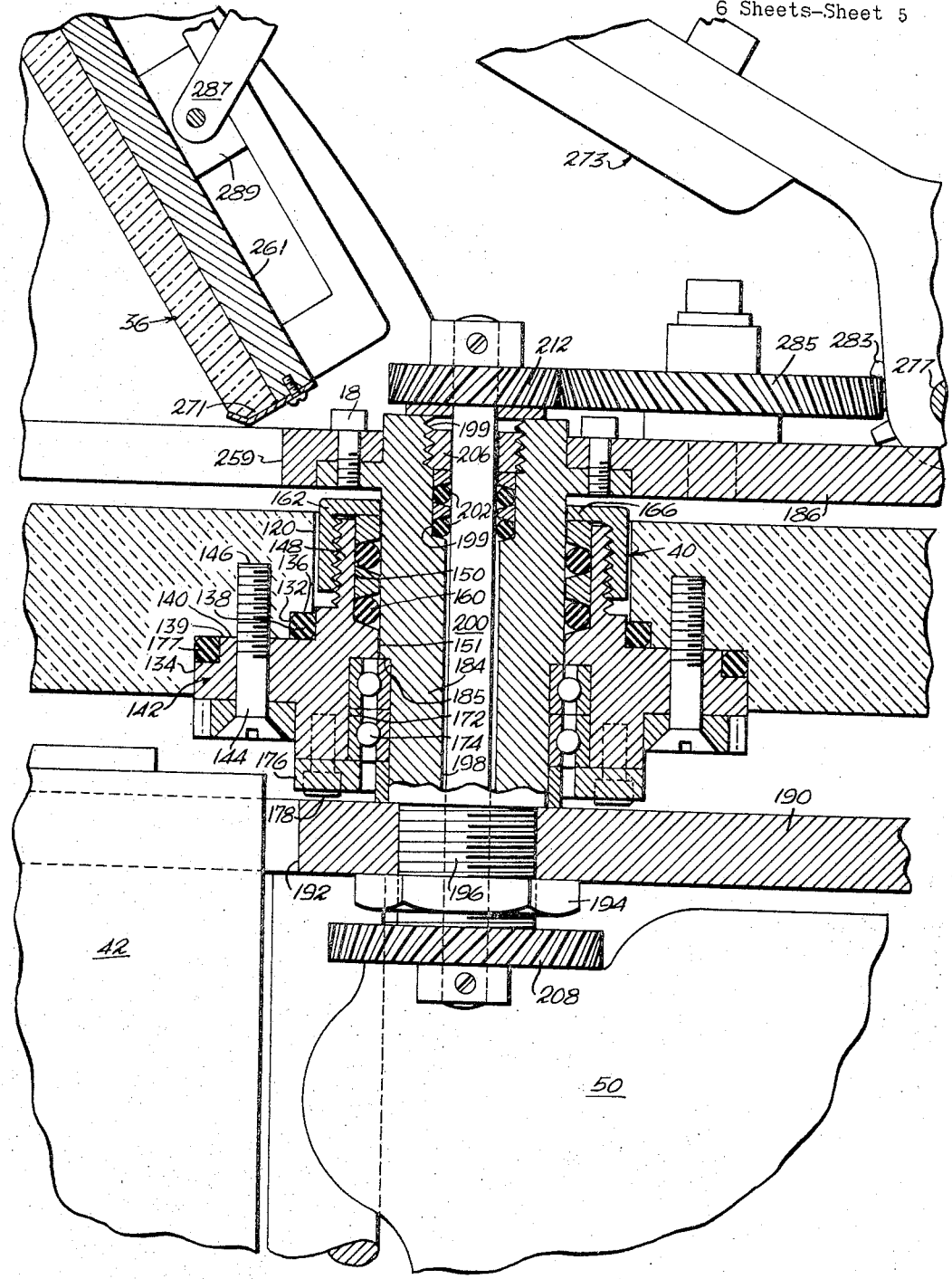
FIG. 6 is an enlarged view in cross section of the central portion of FIG. 2.

The connector means 40 of the preferred embodiment, which means connect the mirror assembly and the camera means of the rotatable system 34, will now be described on reference chiefly to FIGS. 2, 5 and 6. A bore 120 through the septum 26 and coincident with the center line of the bore 72 of the bearing block 70 provides the seat for the connector means 40. As will be described in considerable detail hereinafter, the connector means includes (a) a flanged, tubular carrier member 142 anchored in the bore 120 of the septum 26 to rotatably accommodate (b) a sleeve element 184 which in turn rotatably accommodates (c) a shaft 200, so that the shaft and sleeve element are independently rotatable about a common center line which is also the center line of the tubular carrier member 142.

In more detail, the flanged tubular carrier member 142 is seated in the bore 120 which is provided with a first and a second counterbore 132 and 134 as seen from the camera chamber side of the septum which define the seat 136 for an O-ring 138 and a main seating surface 139 for the tubular member 142 adjacent the shoulder 140. As previously stated, the connector means 40 of the preferred embodiment is arranged in this bore 120 with the flanged tubular member 142 nesting in the counterbore 134 and drawn tightly against the seat surface 139 and snugly against the shoulder 140 by means of threaded screws 144 which are threadably received in the septum recesses designated 146. The flanged tubular member 142 includes an axially extending exteriorily threaded portion 148 which extends to the mirror chamber and is sized such that the exterior threads are spaced radially inwardly from the walls of the bore 120. The portion or extension 148 includes an interior counterbore 150 in the main bore 151 to define a seat for bearings 160 insertable from the mirror assembly side opening to be captivated by means of the bored cap 162 which is threadably receivable on the exteriorly threaded extension and includes the lip 166 to hold the bearings in place as shown in FIG. 2. The camera side face of the flanged member 142 is also provided with a counterbore 172 which defines a seat for bearings 174 which are held in place by means of a disk-shaped keeper 176 secured thereto as by the bolts 178. O-rings, 138 and 177, are preferably provided to maintain the fluid-tight relation between the walls of the flanged tubular member 142 and the septum 26.

The rotatable sleeve 184 is carried in the bore 151 of the flanged member with the axis thereof coincident with that of the first bore 120 through the septum and with the outer surface engaging that surface defined by the innermost portion of the bearings 160 and 174. It is noted that the bearing 174 includes a smaller diameter portion so that a stepped surface 185 is disposed in the bore 151 of the exterior surface of the rotatable sleeve. The axial passage 198 of the sleeve member is also counterbored at 199 to accommodate bearings 202 which are circumposed about the shaft 200, the said bearings 202 being held in place by the ring 206 which threadably engages in the counterbore 199 of the sleeve 184.

It is seen that the sleeve member 184 and the shaft 200 are, therefore, rotatable about a common center line through the flanged tubular member 142 and, further, that the sleeve and the shaft each include an extending portion or end in the camera chamber as well as the mirror assembly chamber.

To the ends of the shaft, gears are attached for rotation therewith, a drive gear 208 in the camera chamber and a driven gear 212 in the mirror chamber. Likewise, to the ends of the sleeve member (a) a driven platform 186 is keyed for rotation in the mirror chamber by means of the bolts 188 and (b) a carrying plate 190 is keyed for rotation with the sleeve member in the camera chamber by means of the nut and bolt assembly 194 and 196.

Referring to the carrying plate 190 of the camera chamber which is best seen in FIG. 5, it is tightly secured to the end of the sleeve member so that it rotates with it. The camera is suspended in the camera chamber on support rods 288 which connect to the carrying plate. The camera is arranged such that the lens view line 45, see FIG. 2, of the lens system is eccentric with respect to the center line of the bore 120 and the bearing block 70 and is arranged centrally of the projection of the mirror, as viewed from the septum, so that the camera is adapted to photograph the image as seen in the mirror or reflector means 36. The carrying plate 190 is provided with an indentation 192 in one edge thereof to permit the near side of the lens systems to be closely adjacent the transparent septum.

The driven platform 186 in the mirror chamber is likewise keyed to the sleeve member so that it rotates together with the carrying plate of the camera chamber. On the driven platform support means 215 are provided and arranged to hold the reflector means 36 such that a central zone of the mirror or reflector means is at all times in the view of the camera lens system, that is, the lens view line 45 when extended intersects the central zone of the reflector means. A drive means for the sleeve member is designated by the numeral 46 in FIG. 5. It is seen that this drive means comprises a motor suspended in the camera chamber from the carrying plate 190 by suitable means such as a strap similar to that shown in FIG. 2 for the drive means 50 which will be described more completely hereinafter. The drive shaft connects to a planet gear 302 which engages a stationary sun gear 304 which is fixed to the flanged tubular member by the screws 144. Thus it is seen that on energization of the drive means 46 the planet gear 302 will revolve about the sun gear 304 and by reason of its connection through the hole 305 in the carrying plate will rotate the carrying plate as well as the carried elements, such as the camera, and that the carrying plate will transmit this rotational movement to the rotatable sleeve element to which it is securely fastened which in turn will rotate the driven platform in the mirror chamber together with the reflector means support and maintain the mirror at all times in the desired position with respect to the axis of rotation and the lens view line 45.

The drive means 50 is also provided with a gear, 210, which drives the drive gear 208 to rotate the shaft and, consequently, the driven gear carried on the end thereof in the mirror chamber above the plane of the driven platform for a purpose which will be described and is for use in tilting the mirror. The tilting of the mirror takes place with respect to the lateral axis 48 which is supported on the support means 215 which are composed of spaced, upstanding arms 255 and 257 arranged on either side of a cut-out 259 in the edge of the driven platform and disposed above the cut-out of the carrying platform 190 and in line with the lens view line. The mirror includes the backing plate 261 and the reflector means 36 carried thereon. The distal ends 263 and 265 of the arms are arranged above and radially outwardly of a reference plane spanning the distance between the arms which includes the lens view line 45. The axis 48 is defined by the confronting pivot pin means 266 and 267 which are in confronting relation to one another and connect to the upper edge 269 of the mirror backing plate. The opposite edge 271 of the reflector means 36 is held at all times on the other side of the aforesaid reference plane; and, in the embodiment shown, the opposite edge 271 is adjustably held by a leg 273 which is pivotally connected for rotation on a lateral rod 277 parallel to the axis 48 supported on spaced, upstanding ears 279 and 281 on the platform. To the rod there is also keyed a gear 283 which is connected to the driven gear 212 by a slave gear 285 to complete a gear train from the drive means 50. The extending distal end 287 of the leg is pivotally connected to a slide block 289 by which it is constrained by guide slots 291 and 293 to movement of translation across the back of the backing plate on energization of the motor 50 which in turn will raise the leg to the dotted line position shown in FIG. 2 with the slide block moving as indicated in the guide slots. It will be noted that stop means 325 are carried on the distal end of the arms to limit the tilt of the reflector 36. It is also seen that as the mirror is moved downwardly about the axis 48 and the distal end of the leg falls the lower or opposite edge of the mirror will move toward the transparent septum and be limited in such movement until the projecting pins 327 and 327′ engage the side of the backing plate or the mirror itself tending to limit further movement. In the embodiment shown, the arm comprises an upper arm 329 and a forearm 341 which are pivotally connected together by the pivot pin means 343 comprising an elbow with the forearm being held in a spring-biased position by means of the spring 345 which can be seen in FIG. 4 until such time as the aforesaid limit pin means engage the backing plate whereupon continued rotational forces will cause the axis 48 to yield and rotate with respect to the axis or elbow designated 48′. In this manner it is seen that there is provided a first stage of tilt with respect to the axis 48 and that movement is about that axis notwithstanding the fact that there is an elbow provided in the arm by reason of the tension of the spring 345 which holds the forearm and upper arm in the relation shown on movement to the dotted line position shown in FIG. 2; and that there is a second stage of tilt when the limit pins engage the mirror holder plate so that continued downward pressure causes a torque which stretches the spring for subsequent release to the normal position depending upon the forces applied through the gear chain. Preferably the camera lens is of the type which is often referred to as a zoom lens and permits of adjustment for distances between the lens system and an object to be photographed. It is thus seen that the scanning device is adapted to photograph through a panoramic range of 360 degrees and that the mirror or reflector means is adapted to be tilted to scan segments above and below the horizon line by tilting it around the first axis 48 on the distal end of the forearm and to scan the upper reaches of the panoramic view, approaching but not reaching the zenith of a hemisphere of observation by tilting the mirror means about the secondary axis of rotation, the elbow of the support arm. Further, it is seen that the central zone of the reflector means is arranged such that an area of it as seen in projection along the lens view line is at all times perpendicular to that lens view line. Let it be known that by reason of the fluid-tight construction of the walls and septum of the mirror chamber the medium chosen for charging through the access means or port 122 may be selected so that light rays entering into the mirror chamber will experience 0° or at most only a slight angle of deviation caused by the differences in density of the medium through which the light travels and that as shown in the drawings the bearings of the connector means are of an O-ring type well known in the plumbing art. FIG. 7 illustrates the central zone of the reflector means and the portion of the central zone in which an image appears as well as the direction of the segment of the panoramic view which appears as an image when viewed along the lens view line.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. An underwater scanning device comprising: a housing including, a transparent portion for viewing an object therethrough and a transparent septum means connected in the body in fluid-tight relation dividing the body interior into a fluid-tight mirror chamber including said transparent portion and a camera chamber, said septum defining a horizon plane between said mirror and camera chambers; a camera in the camera chamber including, a lens system, means mounting the camera with the lens system directed toward the mirror chamber and having a lens view line extending through the septum into the mirror chamber; a mirror assembly in the mirror chamber including a reflector means directed toward said housing portion and means supporting the reflector means such that the reflector means is at all times visible along the lens view line so that the camera lens views an image reflected from the reflector means through the transparent septum at an angle of reflection, such that the image seen is outside of the body; said mirror chamber being filled with a liquid of substantially the same density as that of the liquid in which photographs are to be taken and submerging the reflector to minimize distortion.

2. A device as set forth in claim 1 wherein connector means are provided to connect the camera and the reflector means for rotation together as a system about an axis passing through the horizon plane.

3. A device as set forth in claim 2 wherein drive means are provided to rotate the system.

4. A device as set forth in claim 2 wherein the lens and reflector are eccentric with respect to the axis.

5. A device as set forth in claim 4 wherein drive means are provided to rotate the lens and the reflector means together.

6. A device as set forth in claim 1 wherein tilt means are provided to tilt the reflector means in the mirror chamber so that the image of the reflector as seen along the lens view line can be varied to scan above and below the horizon plane defined by said transparent septum.

7. A device as set forth in claim 6 wherein the tilt means includes the support means for the mirror assembly comprising spaced, parallel upstanding upper arms, a forearm and pivot means defining an elbow to connect said forearm to said upper arm intermediate the length of said upper arm, stop means on the upper arm to limit rotation of the forearm in one direction of rotation and resilient means normally urging the forearm into engagement with the stop means to normally hold the forearm in a predetermined attitude with respect to the upper arm and free to rotate in one direction of rotation only; primary pivot means on the forearm distally of the stop means when the stop means, primary pivot means and elbow are in substantially straight line relation, said primary pivot means defining a first lateral axis, means connecting the reflector means to the primary pivot means along one edge of said reflector means and a leg pivotally carried on the mirror assembly with one end operatively connected to a drive means to raise and lower the leg and with the other end of the leg connected to the other edge of the reflector means in an adjustable connection to raise and lower the other edge of the reflector means about the primary pivot axis, secondary stop means to limit the rotation of the reflector assembly about said primary axis in the other direction of rotation whereby the reflector means may be rotated through a first range of tilt adjustment about the primary axis and into engagement with said secondary stop means and thereafter further torque will cause the reflector means to rotate about an axis through the secondary stop means parallel to the primary axis to cause the elbow to bend out of the normal position storing energy in the spring as the distal end of the forearm rotates about the axis of the secondary stop means.

8. A device as set forth in claim 6 wherein the tilt means are carried on the support means and include a pivot pin connection along one edge of the reflector for rotation about a primary axis to vary the angle of reflection of light rays from the mirror along the lens view line.

9. A device as set forth in claim 3 wherein tilt means are provided to tilt the mirror assembly in the mirror chamber so that the image of the reflector as seen along the lens view line can be varied to scan above and below the horizon line.

10. A device as set forth in claim 9 wherein drive means are provided to operate the tilt means and means operatively connecting the tilt means and the drive means.

References Cited

UNITED STATES PATENTS

| | | | |
|---|---|---|---|
| 1,520,245 | 12/1924 | Humbrecht | 350—26 |
| 2,677,996 | 5/1954 | Laval | 95—11 |
| 2,766,668 | 10/1956 | Harry | 95—12.516 |
| 2,863,713 | 12/1958 | Mito | 95—16 |
| 3,141,397 | 7/1964 | McNeil | 95—15 |
| 3,172,344 | 3/1965 | Jackson | 95—11 |

JOHN M. HORAN, *Primary Examiner.*